Sept. 5, 1944.    R. RYFFE    2,357,610
APPARATUS FOR MACHINING WORK PIECES
Filed May 14, 1941
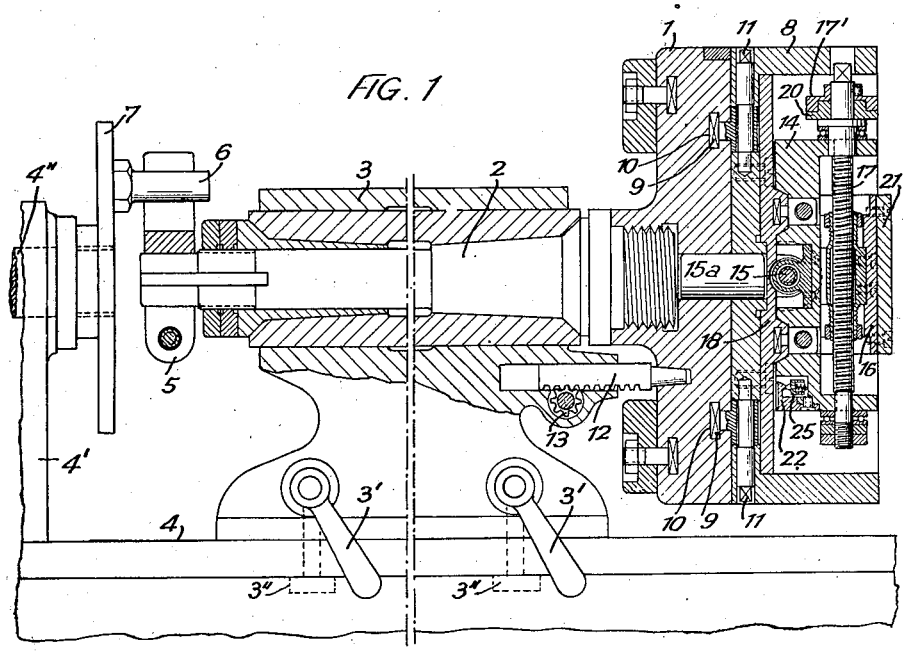
FIG. 1
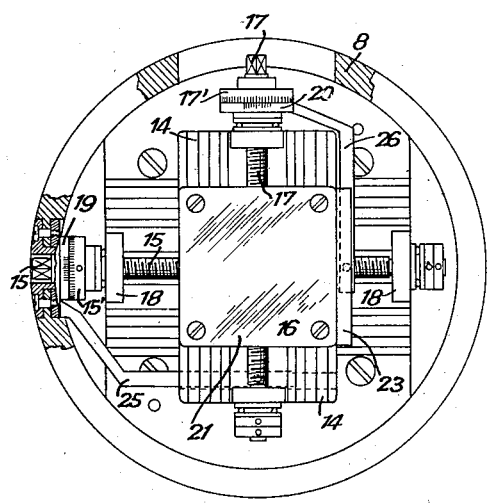
FIG. 2
FIG. 3
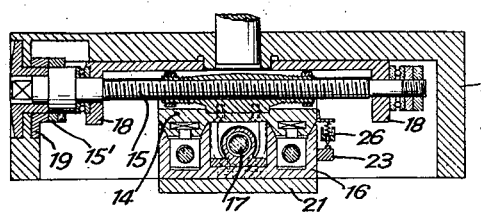
Inventor:
Robert Ryffe
by Sommers & Young
Attorneys Patented Sept. 5, 1944

2,357,610

UNITED STATES PATENT OFFICE 2,357,610

APPARATUS FOR MACHINING WORKPIECES

Robert Ryffé, Zurich, Switzerland, assignor of one-half to Josué Goldschmidt, Zurich, Switzerland Application May 14, 1941, Serial No. 393,421
In Switzerland October 11, 1939

1 Claim. (Cl. 82—34)

This invention relates to apparatus for machining work pieces.

For the mechanical production of work pieces, for example, steel work pieces that are to be provided with center-marks or punchings and serve, for example, for the production of templates consisting of brass and being in the form of plates or bridges for clockworks or time fuses, formerly, so-called pattern drilling machines or measuring machines have been employed. In machines of this kind the points to be provided with center-marks or punchings are determined by means of a displaceably guided working part. This mode of producing work pieces of the kind mentioned above is, however, complicated and thus time-consuming.

The apparatus for machining work pieces, according to the invention, is provided with a rotatable member with which a carrier adapted to be adjusted circumferentially of said member in accordance with a division is associated, a crossed-slide mechanism for the reception of the work piece being arranged on said carrier and cooperating with a measuring device for the adjustment of the crossed slides relative to the axis of the rotatable member.

This apparatus allows of determining in a simple manner the situation of points of a work piece at which the latter is to be worked as well as of working center-marks into the work piece, and boring, turning out, grinding the latter, and so forth. Templates in the form of plates or bridges for purposes previously referred to can be worked in this apparatus directly, as required, so as to be fit for use after having undergone different working operations. The apparatus can be built into existing machine tools, for example lathes, with ease.

An embodiment of the invention is illustrated in the accompanying drawing in which Fig. 1 shows an axial section of this embodiment;

Fig. 2 is a front end elevation thereof partly in section, and

Fig. 3 is a horizontal axial section of Fig. 2.

Referring to Fig. 1, the rotatable member which is designated by 1 is carried by a driving shaft 2 mounted in a bearing 3 resting on the bed 4 of a lathe and being axially displaceable and fixable in position of adjustment on the bed 4 by means of toggle levers 3' and clamping members 3". The shaft 2 is coupled, by means of a detachable driving member 5, to an eccentric pin 6 on a driving disc 7 which is arranged on the spindle 4" of the head stock 4' of the lathe. By this means the rotatable member 1 is in driving association with the head stock spindle 4".

On the front end of the rotatable member 1 a dish-shaped carrier 8 is arranged which is loosely mounted on a central axle pin 15a of the rotatable member 1 and engages into an annular groove 10 concentrically formed in the member 1, by means of shoes 9, so as to be rotatable about the axis of the rotatable member. The shoes 9 can be fixed in position in the annular groove 10 from outside by eccentric bolts 11 by means of a square-bore socket wrench. In this way the position of the carrier 8 circumferentially of the rotatable member 1 can be determined. The angular position of the carrier 8 relative to the member 1 can be read on a peripheral division.

As shown in Fig. 1, the rotatable member 1 is locked in place in a position corresponding with the zero-mark of the said division, by a locking bolt 12 engaging into a conical bore in said member. The locking bolt 12 is displaceably guided in the bearing 3 and can be longitudinally displaced by means of a pinion 13. After retraction of the locking bolt 12 the rotatable member 1 can be driven in unison with the carrier 8 by the shaft 2.

On the carrier 8 are arranged a slide 14 associated with a screw spindle 15 and a slide 16 associated with a screw spindle 17, the latter being mounted on the slide 14, whereas the screw spindle 15 is arranged in a mounting member 18 fixed to the carrier 8. The two slides 14, 16, being interconnected by slide guides, form together with the member 18 a crossed-slide mechanism, the screw spindles 15, 17 of which can be controlled by a square-bore socket wrench which is insertable in the direction from the circumference of the carrier 8 for the purpose of adjusting the two slides individually. The two screw spindles 15, 17 each carry circumferentially thereof a disc 15' or 17', respectively, which discs are each provided with a division cooperating with a nonius which is arranged on a disc 19 or 20, respectively, the latter discs being mounted on the carrier 8 for limited angular displacement.

On the exposed front end of the carrier 8 a holding plate 21 is screwed on to the slide 16. On this holding plate the work piece to be worked is fixed, for example, by means of fastening screws, which are inserted through holes provided in the work piece, or by using clamping means of conventional kinds.

By turning the screw spindles 15, 17 the slides 14, 16 can be adjusted as required, when the rotatable member 1 is set into zero-position and is locked by means of the locking bolt 12 for the purpose of determining in coordination with base lines the points of the work piece to be worked relative to the axis of the rotatable member 1 in accordance with the measurements prescribed. The angular adjustability of the carrier 8, that is, that of the crossed-slide mechanism 14, 16, by means of the annular groove 10, the shoes 9 and the eccentric bolts 11 may be instrumental in carrying out the adjusting work referred to immediately above. In this way, for example, the position of holes of cylindric or conical shape to be worked into the work piece can be determined which holes are then bored into the work piece in the lathe without removing it from the latter.

If a work piece consisting of steel is to be worked the same may subsequently be removed for hardening it and then be secured in position on the holding plate 21 again by correspondingly adjusting the crossed slides, for the purpose of grinding the bored holes to size. Prior to effecting the boring, turning out or grinding to size on the work piece the rotatable member 1 is obviously rotated after the locking bolt 12 has been retracted. By means of the auxiliary apparatus described work pieces intended to serve as templates for plates or bridges for clockworks or for punching purposes or the like can be precisely worked.

To each of the screw spindles 15, 17 of the two slides 14, 16 is correlated a rectifying rule 22 or 23 respectively by being arranged on the respective slide in a known manner so as to cooperate with feeler members 25, 26 respectively that are integral with the respective nonius-carrier discs adapted for performing limited rotative movements.

In the embodiment described the driving association between the lathe and the apparatus according to the invention can be released by detaching the driving member 5 so that the apparatus can be dismounted from the lathe, when not in use, with the aid of toggle levers 3'.

The apparatus according to the invention can be constructed as a separate machine instead of as an auxiliary as described.

I claim:

In an apparatus for machining work pieces, a rotatable member, a bearing rotatably carrying said rotatable member, said rotatable member having a division scale having a zero-setting mark associated therewith in concentric relation to the rotation axis of said member, a locking member interposed between said bearing and said rotatable member for locking the latter to the former in a position of said rotatable member corresponding with the zero-setting of said division scale, a carrier operatively connectible with said rotatable member for common rotation therewith and adjustable circumferentially of said member in accordance with said division scale, a crossed-slide mechanism for the reception of a work piece by means of said crossed slides arranged on said carrier, and a measuring device associated with said mechanism for adjusting said crossed slides relative to said axis of said rotatable member for working said work piece at the point of said piece as adjusted by means of said crossed-slide mechanism.

ROBERT RYFFÉ.